United States Patent [19]
D'Alterio

[11] Patent Number: 6,136,361
[45] Date of Patent: Oct. 24, 2000

[54] METHOD AND APPARATUS FOR MOLDING AND BAKING FOOD

[75] Inventor: Joseph C. D'Alterio, Glen Cove, N.Y.

[73] Assignee: SBJR Restaurants Inc., River Vale, N.J.

[21] Appl. No.: 09/457,673

[22] Filed: Dec. 9, 1999

[51] Int. Cl.[7] .................................. A23L 1/00; A23P 1/00
[52] U.S. Cl. ........................ 426/505; 99/349; 99/372; 99/376; 99/377; 99/426; 99/427; 99/439; 425/439; 426/512; 426/523
[58] Field of Search ........................ 426/505, 512, 426/523; 99/349, 354, 372, 373, 376, 377, 378, 382, 426, 427, 439; 425/439, 441

[56] References Cited

U.S. PATENT DOCUMENTS

| | | | |
|---|---|---|---|
| 5,102,677 | 4/1992 | Van Den Berghe | 426/523 |
| 5,820,907 | 10/1998 | Kloppenburg et al. | 426/505 |
| 5,960,705 | 10/1999 | D'Alterio | 99/349 |

*Primary Examiner*—George C. Yeung
*Attorney, Agent, or Firm*—Paul W. Garbo

[57] ABSTRACT

An apparatus for compressing and baking fluid food under pressure to form unified shaped products has a heated metal mold bottom with a cavity and a heated metal mold top connected to the piston rod of a pneumatic or hydraulic cylinder positioned for alternately pressing the mold top down against the mold bottom and lifting it away from the mold bottom. A hinge-like connection attached along a side of the mold bottom and a reversible drive mechanism associated with the hinge-like connection serve to swing the mold bottom over to an inverted position and then back to the molding position. The simple apparatus automatically ejects the molded food product from the inverted mold bottom. A siamese pair of mold bottoms united back-to-back are preferred for large-scale production of molded food shapes. Every inversion of a siamese pair of mold bottoms can discharge a molded product and form another molded product.

19 Claims, 3 Drawing Sheets

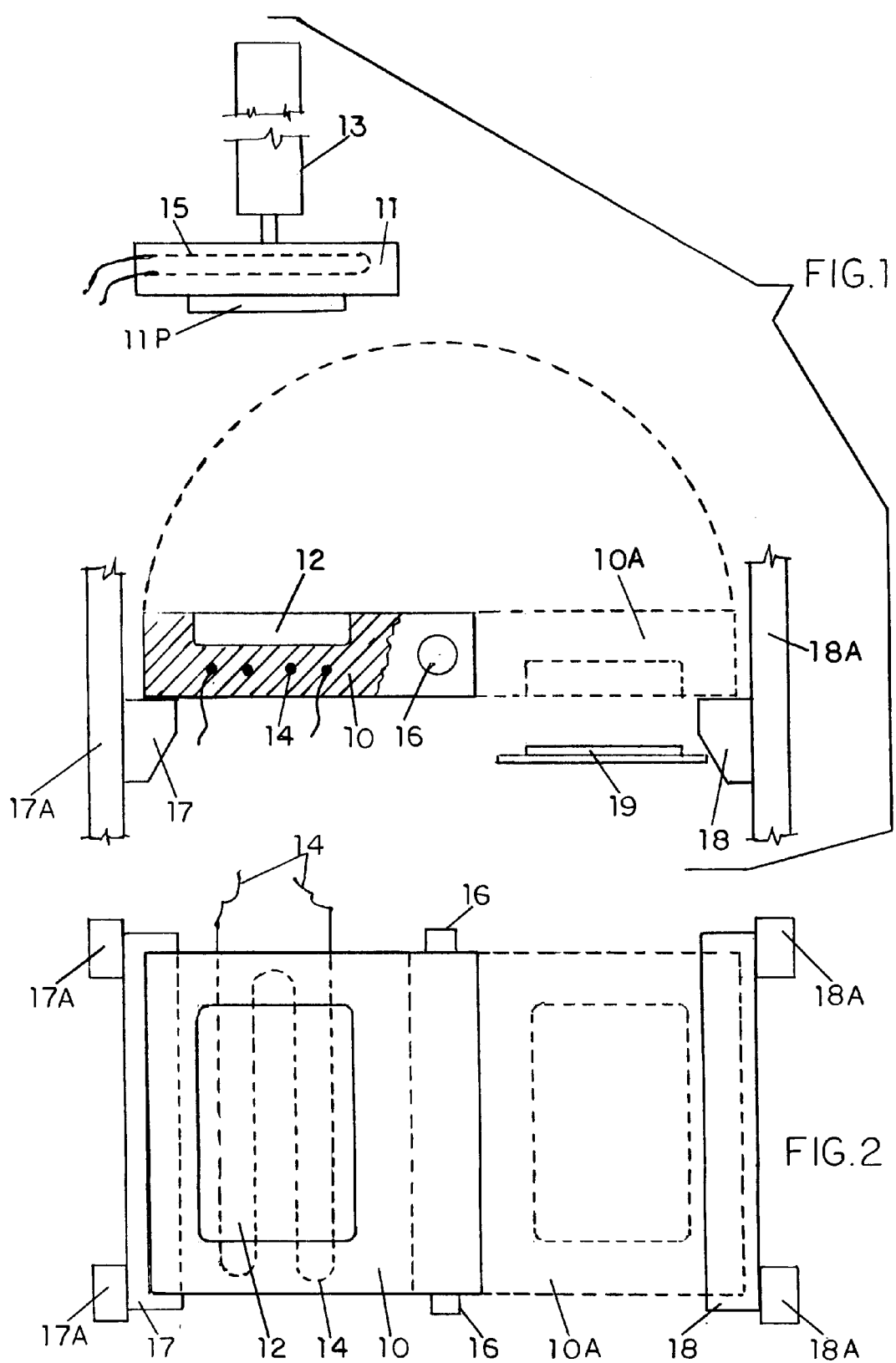

METHOD AND APPARATUS FOR MOLDING AND BAKING FOOD

BACKGROUND OF THE INVENTION

This invention relates to a method and an apparatus for compressing and baking fluid foods into unified products of desired shape. More particularly, the invention involves a mechanically activated mold that discharges the molded product.

Illustrative of an edible product composed of pieces of food bonded together is the pasta-based product of U.S. Pat. No. 5,411,752 to Taylor et al. The patent discloses the formation of discrete pieces of cooked pasta with a binding composition into a desired shape. The pasta-based product is proposed as the base or shell of a pizza and as such may be garnished with tomato sauce, cheese, mushrooms, etc. U.S. Pat. No. 4,693,900 to Molinari also describes a shaped pasta product formed of cooked pasta. Zukerman discloses in U.S. Pat. Nos. 3,711,295; 3,961,087 and 5,137,745 shaped food products composed of rice and other cereal grains.

Applicant's copending application Ser. No. 09/161,638, filed Sep. 28, 1998, now U.S. Pat. No. 6,004,602 discloses an apparatus for compressing and baking flowable food such as pieces of cooked pasta admixed with a binding agent into a coherent product, e.g., a pizza-shaped shell. That apparatus involves a two-part mold bottom that is mechanically activated to discharge the molded product. The commercial appeal of the apparatus is the broad range of product sizes that can be made with the apparatus by changing the mold size. The apparatus is particularly valuable in forming a large product such as a 16-inch pizza-shaped shell. For small products, simpler and less expensive apparatus is desired.

Accordingly, a principal object of this invention is to provide a simple molding apparatus for compressing and baking fluid food into a desired unified product.

Another important object is to provide simple mechanical means for discharging the molded food product from the mold.

These and other features and advantages of the invention will be apparent from the description which follows.

SUMMARY OF THE INVENTION

In accordance with this invention, an apparatus for forming a shaped product of bonded food particles comprises a heated metal mold top and a heated metal mold bottom. The mold top is connected to a vertically mounted hydraulic or pneumatic piston that can alternately press the mold top against the mold bottom and lift it away from the mold bottom. The mold bottom which is in the customary horizontal position during the molding period has hinge means that makes it possible to swing the mold bottom over a full 180 degrees so that a molded product therein drops out. Mechanical means associated with the mold bottom serves to flip over the mold bottom at the end of a selected baking period to eject the molded product. Usually, the flipped mold bottom comes to a jarring stop. The jolt helps to release the molded product. The mechanical means also serves to turn the mold bottom back to the position for starting the molding operation.

The mold bottom has a recess or cavity in which a measured quantity of fluid food, sufficient to form the shaped product, is deposited at the start of the molding operation. The mold top is then pushed down against the mold bottom to compress the food therein. With both the top and bottom of the mold being heated, most simply by electrical heaters attached thereto, the fluid food is converted into a unified product after a selected baking period. Thereupon, the mold top is pulled up away from the mold bottom which is flipped over to discharge the molded product, usually on a conveyor belt. The mold bottom is then turned back to the molding position ready to receive again a measured quantity of flowable food and to start the next molding cycle.

The recess or cavity of the mold bottom can vary from one that has a flat bottom and a smooth encircling wall to one with a contoured bottom, e.g., contoured like an upside-down pizza base or shell. The mold top can also vary from one with a flat molding face to one with a convexly or concavely contoured molding face. In short, the molded product can be made in various shapes and with surface patterns.

For rapid, high-quality production of molded food pursuant to this invention, the flipable mold bottom has a duplicate mold bottom attached thereto in back-to-back relation. Thus, when the baking period in one mold bottom is ended and the mold bottom is inverted to discharge a unified food product, the siamese twin mold bottom is in position to have fluid food placed in its cavity. Thus, ejection of a molded food product from one mold bottom and the injection of fluid food into the twin mold bottom take place simultaneously. The siamese twin mold bottom not only speeds up production but also conserves electrical energy; by contrast, energy used to flip a single mold bottom after ejecting a molded food product is not credited with the ejection of an additional molded product as in the case of a siamese mold bottom.

Temperatures in the range of about 300° F. to 500° F. are usually chosen, depending on the food to be baked. At such temperatures the compressed food in the mold generates steam and other volatiles very rapidly. To prevent the development of a troublesome gas pressure, the mold top is permitted to pop up slightly several times during the baking period to vent steam and volatiles.

The term, fluid food, is used herein to embrace loose granular food particles like bread crumbs, or pieces of cooked pasta such as linguini admixed with a binding agent, or a soft mixture similar to a pudding, or soft coherent food like mashed potatoes or dough. Hence, fluid food means food ingredients that are fluent, flowable or deformable and therefore moldable under compression. Pieces of food introduced in the mold, such as cut linguini, preferably have a length not exceeding about 3 inches.

BRIEF DESCRIPTION OF THE DRAWINGS

FIG. 1 is a diagrammatic elevation of a simple embodiment of the mold bottom and mold top forming the molding apparatus of the invention;

FIG. 2 is a diagrammatic top view of the apparatus of FIG. 1 without its mold top;

DESCRIPTION OF PREFERRED EMBODIMENTS

Figure 3:
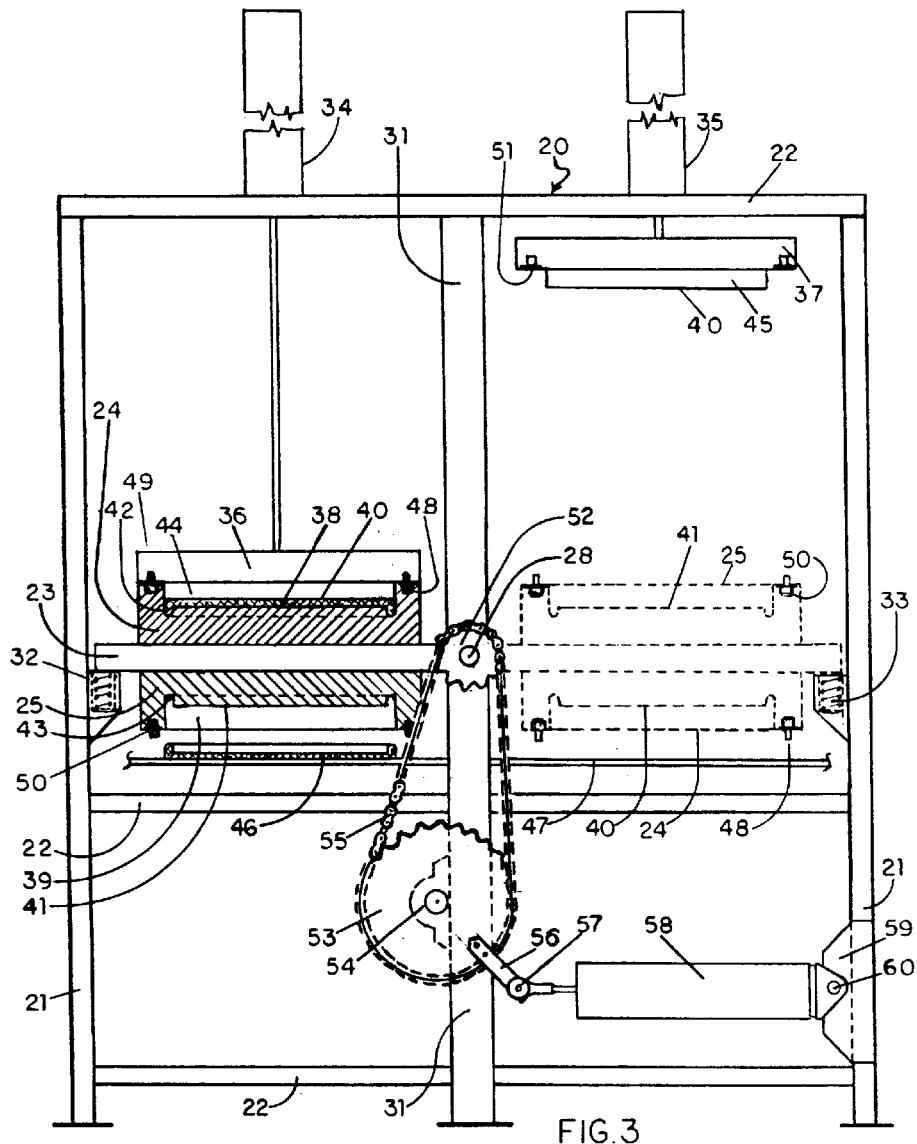
FIG. 3 is an elevation of a preferred embodiment of the invention featuring back-to-back siamese twin mold bottoms.

FIG. 1 and FIG. 2 diagrammatically show the basic parts of the invention and their movements. The molding system is formed by mold bottom 10 (shown mostly in cross section) and mold top 11. Mold bottom 10 has a recess or cavity 12 and mold top 11 has a narrow protrusion 11P shaped to fit in, and dip into, cavity 12 for only a part of the depth of cavity 12 so as to leave a space between protrusion 11P and the bottom of cavity 12 equal to the desired thickness of the molded food product. Protrusion 11P is preferred for molding very fluid or wet foods.

For less fluid or dry foods, mold top 11 may have a flat bottom, i.e., protrusion 11P is eliminated. Also, the molding face of protrusion 11P or the portion of the flat bottom of mold top 11 that covers cavity 12 may be slightly concave to allow expansion of the food that is being baked.

Mold top 11 is usually connected to mechanical means that alternately can press it down on mold bottom 10 and raise it away therefrom. Hydraulic or pneumatic piston 13 is a preferred simple means for moving mold top 11 up and down. Mold parts 10, 11 have electric heaters 14, 15 embedded in the aluminum body of each part 10, 11. Copper is a good alternate metal for forming mold bottom and top 10, 11.

The distinctive novel feature of the invention is the flipping over of mold bottom 10, when the molding therein has been completed, so that the molded product drops out of cavity 12. Therefore, mold bottom 10 is provided with shaft stubs 16 which are held in fixed bearings (not shown). With mold bottom 10 resting horizontally on a support bar 17, fastened to a pair of uprights 17A, a measured quantity of fluid food is deposited therein. Piston 13 is activated to push mold top 11 down against mold bottom 10. Electric heaters 14, 15 are set to maintain a desired temperature, say 450° F., and at the end of a selected baking period, piston 13 is activated to pull mold top 11 up away from mold bottom 10. Thereupon, either manually but preferably mechanically mold bottom 10 is swung clockwise on its shaft stubs 16 until it is fully inverted (position 10A indicated by dotted lines) when it strikes bumper stop 18 fastened to a pair of uprights 18A. Of course, the molded food product 19 drops out of cavity 12 to a receiving table, chute or conveyor. Emptied mold bottom 10 is flipped counterclockwise back to support base 17 so that the molding and baking cycle can be repeated.

Figure 4:
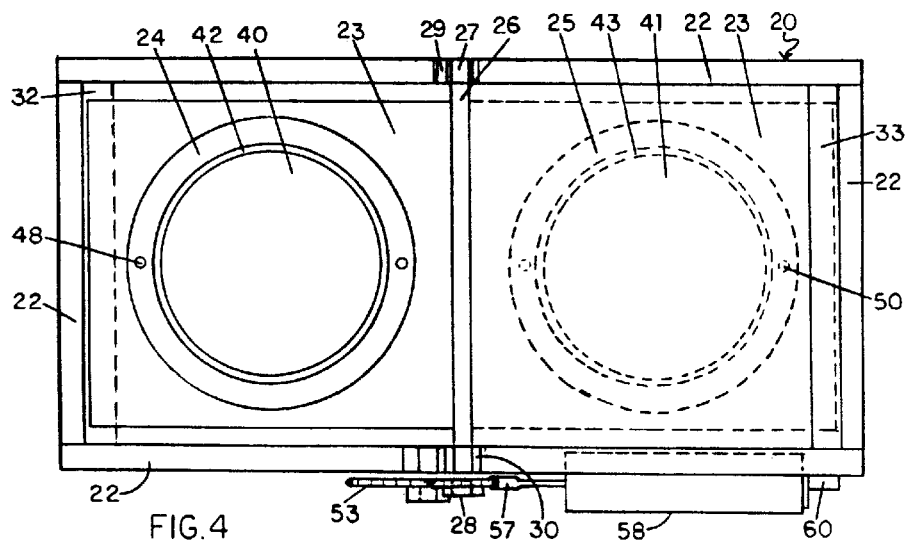
FIG. 4 is a top view of the apparatus of FIG. 3 without the mold tops and attached pistons.

FIG. 3 and FIG. 4 show a double version of the mold bottom and mold top of the invention in which the two mold bottoms are joined back-to-back so that each time the siamese twin mold bottoms are flipped over another molded food product is ejected. In FIG. 1, a food product is ejected only when the mold bottom is swung over clockwise.

A three-dimensional rigid frame 20 formed of steel or aluminum uprights 21 and lateral bars 22 supports the apparatus of the invention. A metal plate 23 has two mold bottoms 24, 25 (shown in diametrical section in FIG. 3) fastened to its opposite sides. A shaft 26 is welded or otherwise attached to a lateral side of plate 23. The opposite ends 27, 28 of shaft 26 are held in bearings 29, 30, respectively, that are fastened to lateral bars 22 (omitted in FIG. 3 to present an unobstructed view of essential parts of the apparatus). A heavier upright 31 at the middle of each of the longer lateral bars 22 reinforces frame 20 where the load of plate 23 with mold bottoms 24, 25 is greatest.

The edge of plate 23 opposite the edge fastened to shaft 26 is supported by bumper bar 32 that is fastened to a pair of uprights 21. Bumper bar 33 is similarly fastened to a pair of uprights 21 at the opposite end of frame 20. Bumper bars 32, 33 are positioned to support plate 23 in the horizontal position. The top lateral bars 22 provide support for pneumatic or hydraulic pistons 34, 35, the piston rods of which are connected to mold tops 36, 37, respectively.

Mold bottoms 24, 25 are cylindrical and each has a cylindrical recess or cavity 38, 39, with a flat bottom 40, 41 surrounded by a narrow channel 42, 43, respectively. Thus, each cavity 38, 39 is contoured and dimensioned to mold food in the typical shape of a pizza base or shell. Mold tops 36, 37 can have flat bottom faces but preferably have cylindrical, flat protrusions 44, 45 that fit in cavities 38, 39 respectively, when mold tops 36, 37 are pressed against corresponding mold bottoms 24, 25. The vertical dimension of protrusions 44, 45 is chosen to leave a space, say 0.4 inch, between the flat bottoms 40, 41 of cavities 38, 39 and the flat faces of protrusions 44, 45, respectively. The selected space will be the thickness of the pizza shell formed therein.

FIG. 3 shows the siamese twin mold bottoms 24, 25 in the position where a pizza-shaped molded product 46 (shown in diametrical section) has dropped out of cavity 39 of mold bottom 25 on to conveyor belt 47. Almost simultaneously, a measured quantity of fluid food sufficient to fill cavity 38 of mold bottom 24 was deposited therein and piston 34 was activated to lower mold top 36 and press it against mold bottom 24. To ensure good alignment, mold bottom 24 is provided with a pair of dowel guide pins 48 which slip into a corresponding pair of pin receptors 49 in mold top 36. Similarly, mold bottom 25 has a pair of guide pins 50 and mold top 37 has a pair of pin receptors 51.

At the end of a selected baking period, mold bottom 24 and mold top 36 being heated by electric elements (not shown), piston 34 is activated to lift mold top away from mold bottom 24 and mechanical means are activated to swing plate 23 clockwise 180 degrees so that it comes to rest on bumper bar 33. Now mold bottom 25 (shown by dotted lines) is positioned for the introduction of fluid food immediately following the discharge of a pizza-shaped product from inverted mold bottom 24 on to conveyor belt 47. As soon as fluid food has been deposited in mold bottom 25, mold top 37 is brought down against mold bottom 25 to compress and bake the fluid food as already explained in relation to mold bottom 24 and mold top 36. At the end of the chosen baking period, mold top 37 is lifted away from mold bottom 25, and the mechanical means are made to swing plate 23 counterclockwise to the starting position shown in FIG. 3, where the molded product 46 drops out of mold bottom 25 and the molding cycle is repeated in mold bottom 24.

Those skilled in mechanical drives will visualize various known mechanisms for flipping plate 23 both clockwise and counterclockwise. The essence of the invention lies in the siamese arrangement of two mold bottoms which can be swung alternately clockwise and counterclockwise 180 degrees. A simple but effective mechanism is shown in FIG. 3 and FIG. 4. Shaft end 28 extends beyond fixed bearing 30 and has sprocket wheel 52 attached thereto. A larger sprocket wheel 53 has an axle held in bearing 54 mounted on upright 31. A link chain 55 (omitted in FIG. 4 to show sprockets 52, 53) meshes with sprockets 52, 53 and encircles both so that rotation of sprocket 53 causes rotation of sprocket 52. A radial bar or arm 56 is attached to the face of sprocket 53 and the end of arm 56 which extends beyond sprocket 53 has a pivoted connection 57 to the rod of pneumatic or hydraulic piston 58. Bracket 59 attached to upright 21 provides a pivoted connection 60 to piston 58.

Thus, at the end of the baking period in mold bottom 24, piston 34 pulls mold top 36 up away from mold bottom 24 and piston 58 pushes radial arm 56 toward the left causing its pivoted connection 57 to move in a clockwise arc. Simultaneously, piston 58 was free to slant downward from its pivoted connection 60. The clockwise movement of arm 56 and sprocket 53 is transmitted to sprocket 52 by link chain 55. Clockwise movement of sprocket 52 on shaft 26 causes plate 23 to swing clockwise. The outward stroke of the rod of piston 58 is set to effect a one-half clockwise rotation (180 degrees) of sprocket 52. Of course, the inward stroke of piston 58 achieves an equal counterclockwise rotation of sprocket 52 so that plate 23 is returned to the position shown in FIG. 3.

Figure 5:
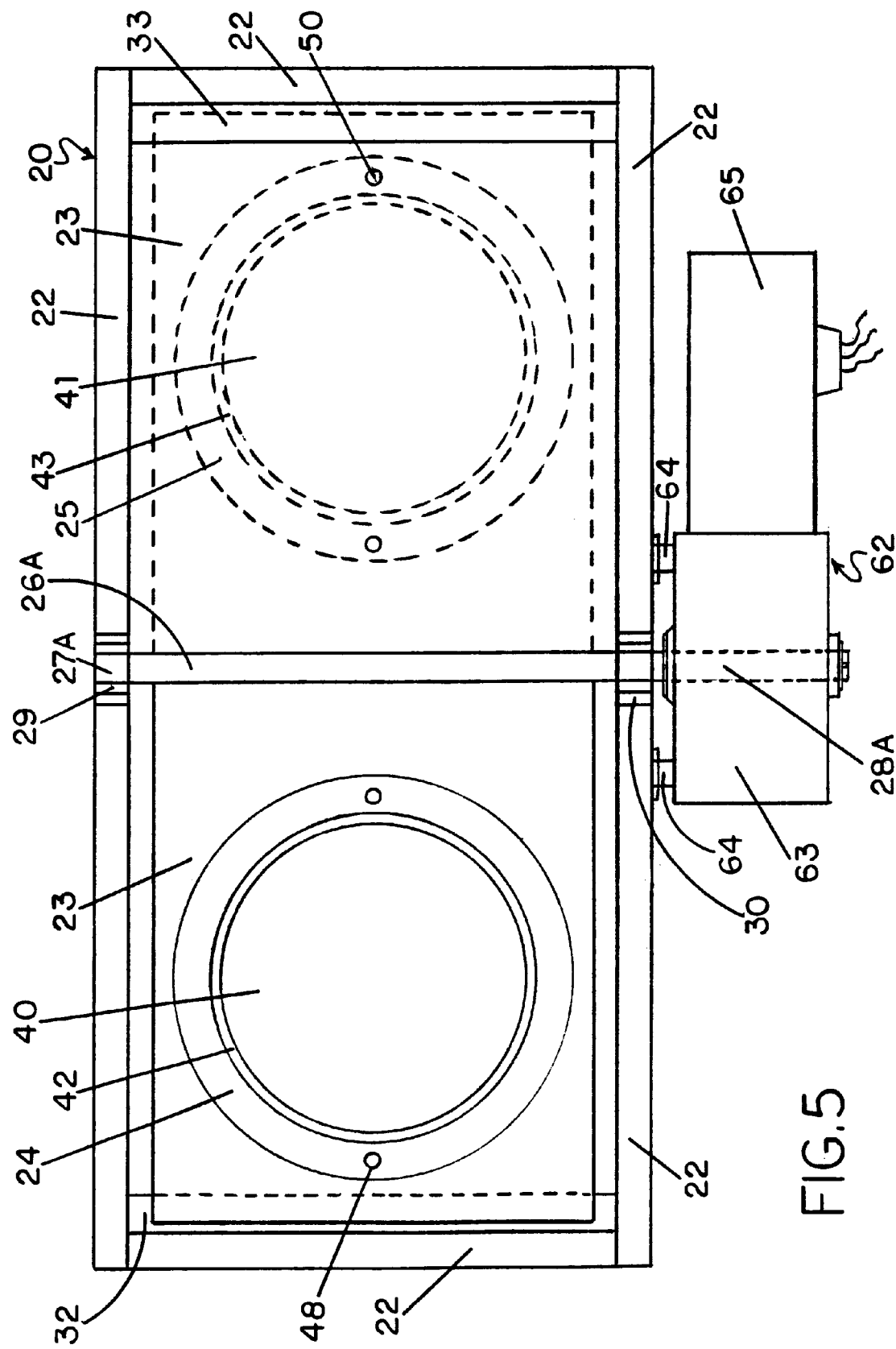
FIG. 5 is like FIG. 4 but showing a different reversible drive means for flipping the twin mold bottoms.

FIG. 5 differs from FIG. 4 in that the reversible drive means (elements 52 to 60 in FIGS. 3 and 4) for flipping siamese twin mold bottoms 24, 25 has been replaced in FIG. 5 by motorized gear drive 62. The gear box 63 of drive unit 62 is fastened at 64 to support frame 22. Shaft 26A for swinging twin mold bottoms over 180 degrees has an elongated end 28A that extends beyond bearing 30 and through gear box 63 where it is keyed to its drive. Electric motor 65 attached to gear box 63 serves to power gear box 63 which in turn rotates shaft 26A to flip mold bottoms 24, 25. Eurodrive, Inc. of Troy, Ohio, is a supplier of motorized gear drives. A right angle gear motor equipped with a disk brake offered by Eurodrive is well suited for reversibly swinging twin mold bottoms 24, 25 of FIG. 5 or single mold bottom 10 of FIG. 2.

Each time plate 23 is flipped over at the end of a food molding and baking period, the impact of plate 23 on bumper bar 32 or 33 facilitates the release and dropping of the molded food from inverted mold bottom 25 or 24. Automatic discharge of the molded food product is a distinctive feature and advantage of the flipable mold bottom.

Variations and modifications of the invention will be apparent to those skilled in the art without departing from the spirit or scope of the invention. For example, plate 23 can be eliminated by joining mold bottoms 24, 25 directly back-to-back or even forming mold bottoms in opposite faces of a single metal block. A rotatable shaft attached to a side of the siamese twin mold bottoms will serve to flip the twin mold bottoms clockwise and counterclockwise. A desirable addition to the flipable mold bottom, whether as a single or as twins, is a counterweight which has not been shown in the drawings to avoid obscuring the essential elements of the invention. Also, while one piston has been shown for moving the mold top down and up, two may be preferred especially for large mold tops. Moreover, any mold bottom may have several cavities side by side to form several molded food products in each compressing and baking cycle. Accordingly, only such limitations should be imposed on the invention as are set forth in the appended claims.

What is claimed is:

1. An apparatus for compressing and baking fluid food under pressure, which comprises a heated mold bottom with hinge means along one side thereof, a heated mold top connected to a piston rod of a vertically suspended pneumatic or hydraulic cylinder positioned to push said mold top against said mold bottom and to pull said mold top up away from said mold bottom, and reversible drive means associated with said hinge means to swing said mold bottom 180 degrees and to swing said mold bottom back 180 degrees.

2. The apparatus of claim 1 wherein the drive means comprises a first sprocket wheel attached to the hinge means, a second sprocket wheel rotatably mounted in a fixed position spaced from said first sprocket wheel, a drive chain looped around said first and second sprocket wheels so that rotation of one effects rotation of the other, and a pneumatic or hydraulic cylinder with its piston rod connected to rotate said second sprocket wheel, each outward or inward stroke of said piston rod being selected to swing said bottom mold 180 degrees.

3. The apparatus of claim 2 wherein the mold bottom has a cavity with a flat bottom surrounded by a deeper rim portion, and said mold bottom and the mold top are heated by electric heating elements.

4. The apparatus of claim 3 wherein the mold top has a protrusion that fits in the cavity of the mold bottom, the molding face of said protrusion being flat and spaced from the flat bottom of said cavity when said mold top is pushed against said mold bottom.

5. The apparatus of claim 2 wherein a counterweight is attached to the hinge means to reduce the energy to swing the mold bottom 180 degrees.

6. The apparatus of claim 1 wherein the drive means is a motorized gear drive connected to the hinge means, the mold bottom has a cavity with a flat bottom surrounded by a deeper rim portion, and the mold top has a protrusion that fits in said cavity, the molding face of said protrusion being flat and spaced from the flat bottom of said cavity when said mold top is pushed against said mold bottom.

7. An apparatus for compressing and baking fluid food under pressure, which comprises heated, twin mold bottoms united back-to-back and supported horizontally, hinge means attached to a side of said united mold bottoms so that said united mold bottoms can be swung 180 degrees alternately clockwise and counterclockwise, a first heated mold top connected to a piston rod of a first vertically suspended cylinder positioned to push said first mold top against, and pull it away from, one of said united mold bottoms, a second heated mold top connected to a piston rod of a second vertically suspended cylinder positioned to push said second mold top against, and pull it away from, the other of said united mold bottoms, and reversible drive means associated with said hinge means to swing said united mold bottoms 180 degrees from below said first mold top to below said second mold top and back 180 degrees.

8. The apparatus of claim 7 wherein the drive means comprises a first sprocket wheel attached to the hinge means, a second sprocket wheel rotatably mounted in a fixed position spaced from said first sprocket wheel, a drive chain looped around said first and second sprocket wheels so that rotation of one effects rotation of the other, and a pneumatic or hydraulic cylinder with its piston rod connected to rotate said second sprocket wheel, each outward or inward stroke of said piston rod being selected to swing the united mold bottoms 180 degrees.

9. The apparatus of claim 7 wherein each of the united mold bottoms has a cavity with a flat bottom surrounded by a deeper rim portion, and said united mold bottoms and the first and second mold tops are heated by electric heating elements.

10. The apparatus of claim 9 wherein each of the first and second mold tops has a protrusion that fits in the cavity of one of the united mold bottoms, the molding face of said protrusion being flat and spaced from the flat bottom of said cavity when one of said mold tops is pushed against one of said united mold bottoms.

11. The apparatus of claim 7 wherein a counterweight is connected to the hinge means to facilitate the 180 degree swings of the united mold bottoms.

12. The apparatus of claim 7 wherein the drive means is a motorized gear drive connected to the hinge means, each of the united mold bottoms has a cavity with a flat bottom surrounded by a deeper rim portion, and each of the first and second mold tops has a protrusion that fits in the cavity of one of the united mold bottoms, the molding face of said protrusion being flat and spaced from the flat bottom of said cavity when one of said mold tops is pushed against one of said united mold bottoms.

13. The apparatus of claim 12 wherein a counterweight is connected to the hinge means to facilitate the 180 degree swings of the united mold bottoms.

14. A method of molding and baking fluid food under pressure into a unified, shaped product, which comprises depositing a measured quantity of said fluid food in a cavity of a heated mold bottom, pressing a heated mold top against said mold bottom for a selected baking period, then removing said mold top from said mold bottom, swinging said mold bottom over 180 degrees to discharge said unified, shaped product from said cavity, and reversely swinging said mold bottom over 180 degrees to receive again said quantity of said fluid food.

15. A method of molding and baking fluid food under pressure into a unified, shaped product with a heated, twin mold bottom having twin cavities disposed back-to-back, said twin mold bottom being flipable 180 degrees along one side of said twin mold bottom, the method comprises depositing a measured quantity of said fluid food in one of said twin cavities, pressing a heated mold top against said twin mold bottom for a selected baking period, then removing said mold top from said twin mold bottom, flipping said twin mold bottom 180 degrees to eject said unified, shaped product from said one of said twin cavities and to receive said quantity of said fluid food in the other of said twin cavities, pressing a heated mold top against said twin mold bottom for said baking period, then removing said mold top from said twin mold bottom and reversely flipping said twin mold bottom 180 degrees to eject said unified, shaped product from said other of said twin cavities and to receive again said quantity of said fluid food in said one of said twin cavities.

16. The method of claim 14 wherein the fluid food is cooked pasta pieces admixed with an aqueous binding agent, said pasta pieces being not longer than 3 inches.

17. The method of claim 16 wherein the cavity of the mold bottom has a flat bottom surrounded by a deeper rim portion to form in said cavity a unified product shaped like an inverted pizza shell.

18. The method of claim 15 wherein the fluid food is cooked pasta pieces admixed with an aqueous binding agent, said pasta pieces being not longer than 3 inches.

19. The method of claim 18 wherein each of the twin cavities has a flat bottom surrounded by a deeper rim portion to form in the cavity a unified product shaped like an inverted pizza shell.

* * * * *